United States Patent [19]

Sievenpiper

[11] 4,079,951
[45] Mar. 21, 1978

[54] METAL PISTON WITH ANNULAR FLANGES HAVING SYNTHETIC OVERLAY AND ANNULAR SEAL

[75] Inventor: Ward Sievenpiper, Milgrove, N.Y.

[73] Assignee: A-T-O Inc., Willoughby, Ohio

[21] Appl. No.: 776,103

[22] Filed: Mar. 10, 1977

[51] Int. Cl.² .............................. F02F 5/00; F16J 9/06
[52] U.S. Cl. .................................... 277/165; 277/166; 277/189.5; 277/235 R; 267/1.5; 92/256
[58] Field of Search ................... 277/165, 189, 189.5, 277/166, 235 R, 235 A, DIG. 6; 267/1.5; 92/256, 255, 249

[56] References Cited

U.S. PATENT DOCUMENTS

| | | | |
|---|---|---|---|
| 3,540,746 | 11/1970 | Jepsen et al. | 277/199 X |
| 3,588,134 | 6/1971 | Sievenpiper | 277/235 R |
| 3,636,824 | 1/1972 | Clark | 92/249 |
| 3,885,800 | 5/1975 | Sievenpiper | 277/165 |

Primary Examiner—Robert S. Ward, Jr.
Attorney, Agent, or Firm—Christel & Bean

[57] ABSTRACT

A piston and cylinder device wherein the piston comprises an annular metal core with a peripheral groove for receiving an annular seal. The metal core has a peripheral overlay of nylon which provides a bearing surface at each side of the peripheral groove and the overlay follows the contour of the periphery of the metal core including the walls of the peripheral seal receiving groove.

12 Claims, 2 Drawing Figures

METAL PISTON WITH ANNULAR FLANGES HAVING SYNTHETIC OVERLAY AND ANNULAR SEAL

BACKGROUND OF THE INVENTION

This invention relates to a novel piston construction and more particularly to the combination of such piston construction with means for effectively sealing the same against leakage between the piston and the cylinder in which it operates.

It is known in the prior art to provide piston means with an expansible ring or rings for sealing the piston against fluid leakage in conjunction with bearing rings which encircle the piston and have axial sliding engagement with the interior wall of the cylinder in which the piston operates. Examples of constructions of this general type are found in my prior U.S. Pat. No. 3,588,134 dated June 28, 1971 and U.S. Pat. No. 3,885,800 dated May 27, 1975.

As shown in the former of the above two patents the bearing ring may comprise a composite structure including an aluminum supporting ring having an encircling ring of synthetic plastic material, for instance nylon, which directly engages the cylinder wall to provide a bearing of relatively low frictional characteristics.

SUMMARY OF THE INVENTION

According to the present invention a piston structure is provided wherein the principal body element of the piston comprises a metal core having a substantial capacity for receiving and storing frictional heat. The external periphery of this metal core has molded thereabout a synthetic resin bearing sleeve, as for instance nylon, and the exterior of the nylon sleeve is grooved to receive an annular seal which engages the wall of the cylinder in which the piston operates.

The metal core, which may be aluminum, is grooved somewhat similarly to the grooved nylon sleeve so that the wall thicknesses of the latter are held to a practical minimum whereby heat develped in the bearing sleeve is readily conducted to the metal core to maintain the temperature of the nylon sleeve within effective and practical limits.

Since the exterior periphery of the metal core is entirely covered by the nylon bearing which is molded thereabout the necessity for machining of the metal core is minimized. Furthermore, radially projecting flange portions of the metal core are provided with a series of axially extending perforations which receive portions of the nylon material when the bearing is molded about the core, thus securely locking the nylon bearing to the metal core.

DESCRIPTION OF THE ILLUSTRATED EMBODIMENT

Figure 1:
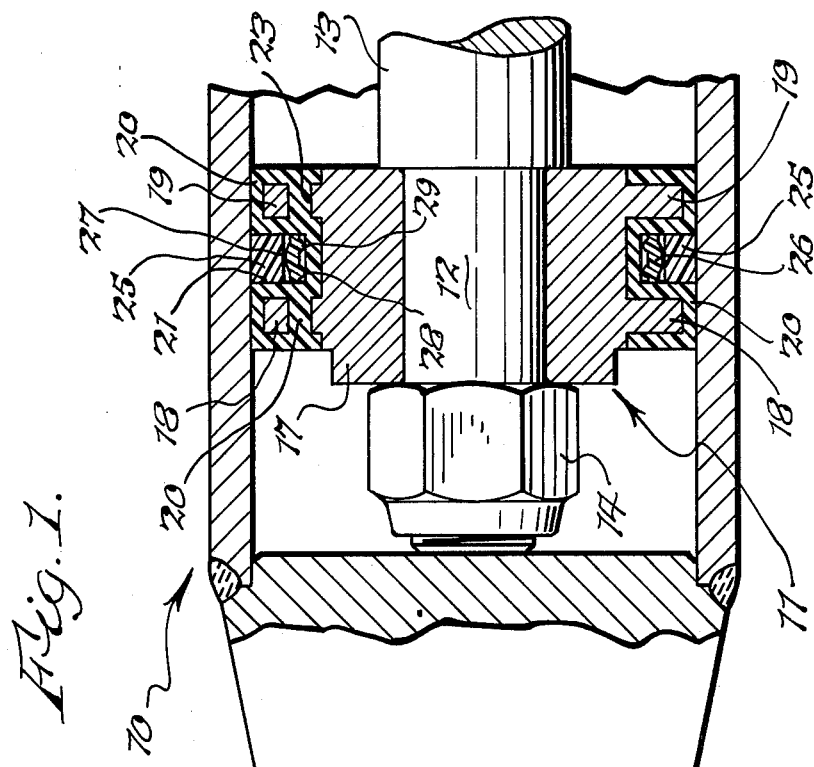
FIG. 1 is a fragmentary elevational view of a portion of one end of a piston and cylinder device, such as a shock absorber, with a portion shown in longitudinal cross section, showing one form of the piston construction of the present invention.

In FIG. 1 the numeral 10 designates a cylinder member which may comprise the principal body portion of a shock absorber or other piston and cylinder device. A piston assembly is designated generally by the reference numeral 11 and is attached to a reduced end portion 12 of a piston rod element 13. The piston assembly 11 is retained on reduced portion 12 of piston rod 13 by a nut 14. In the present instance the left-hand end of cylinder 10 has an eye formation 16 as in conventional shock absorber and similar constructions.

The piston assembly 11 includes a support element in the form of a metal core which may be of cast aluminum and is designated 17 in FIG. 1. The peripheral contour of core 17 is best shown in the lower portion thereof in FIG. 1 and includes a pair of axially spaced radially projecting annular flanges 18 and 19. The actual bearing material which slidably supports the piston member in cylinder 10 may comprise nylon having a glass fiber content of approximately 35% although various generally equivalent bearing materials may be employed. The bearing material may also include a small amount of molybdenum disulfide to promote lubricity. This bearing material overlay is designated 20 in FIG. 1 and generally follows the peripheral contour of the core element 17. The nylon bearing overlay 20 thus includes an annular channel 21 which lies generally between the flanges 18 and 19 of core element 17 and receives an annular seal assembly which will presently be described.

Figure 2:
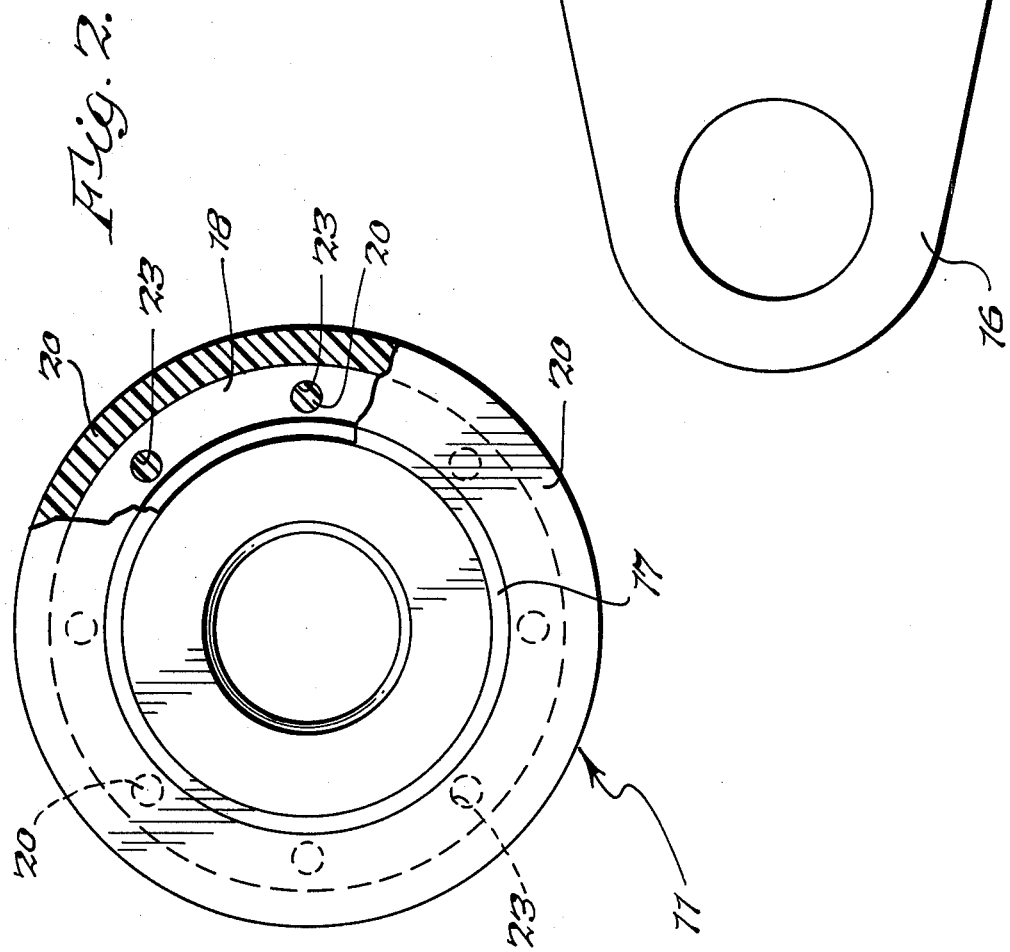
FIG. 2 is an end elevational view of the piston element of FIG. 1.

As shown in FIG. 2 and in the upper portion of the piston assembly of FIG. 1 the core element 17 includes a circumferential series of apertures 23 which extend through the flanges 18 and 19 of the core element. When the bearing overlay 20 is molded about the core element 17 the then flowable nylon or equivalent material fills the several apertures 23 thus forming a secure bond between the nylon overlay 20 and the core element 17. In addition to locking the bearing overlay to the core element the presence of the openings 23 in the core element and the plastic material which fills the same provides additional heat conducting surfaces for transferring heat from the bearing overlay to the metal core 17.

The seal assembly which is disposed in the annular channel 21 in the bearing overlay 20 may be substantially prior U.S. Pat. No. 3,885,800 referred to earlier herein.

The seal assembly, as described more fully in U.S. Pat. No. 3,885,800, comprises an outer annular split sealing ring 25 and an endless, inner annular expander ring 26. Outer ring 25 bears against the interior wall of the cylinder 10 in sliding engagement to provide a fluid-tight seal between the cylinder wall and the exterior periphery of ring 25. The inner expander ring 26 urges the outer ring 25 radially outwardly to urge the outer surface thereof into tight sealing engagement with the interior wall of cylinder 10. Split ring 25 is preferably formed of nylon containing a filler of glass fibers to add strength and lengthen the useful life of the ring. Ring 24 preferably further includes molybdenum disulfide to add lubricity.

Expander ring 26 is positioned in channel 21 radially inwardly of split-ring 25 and is of a synthetic plastic material of a relatively high durometer rating such as urethane, which, while softer than the material of split ring 25, is of a substantially higher durometer rating than conventional deformable rubber O-rings which are sometimes used as expander elements for split ring elements.

Expander ring 26 fits snugly between the side walls of channel 21 of the piston overlay and is provided with an external bead 27 which bears outwardly against the interior of split ring 25. Expander ring 26 further includes a pair of internal beads 28 and 29 whereby the ring seats squarely within the bottom of annular channel 21. It will be noted that the seal assembly is proportioned to lie generally between the flanges 18 and 19 of core element 17 to be supported thereby in an axial direction.

While an illustrative embodiment of the present invention has been illustrated in the drawing and described in detail in the foregoing specification, it is to be understood that this disclosure is by way of example only and not by way of limitation.

I claim:

1. A piston assembly for axial movement in a cylinder, said assembly comprising an annular metal core having a pair of axially spaced radially-extending annular flanges at the exterior periphery thereof, an overlay of synthetic resin material extending over the surface portions of said flanges whereby the portions of said overlay at the peripheries of said flanges provide bearing means for supporting said piston in said cylinder, and an annular seal disposed in the axial space between the overlay material at the facing radial surfaces of said flanges and adapted to engage said cylinder wall in sealing relationship.

2. A piston assembly according to claim 1 wherein said synthetic overlay extends continuously about the interior annular space between said flanges whereby said annular seal means seats thereagainst at the inner diameter of said seal means and at the end faces thereof.

3. A piston assembly according to claim 1 wherein said seal means comprises an annular outer member of relatively non-deformable material and an inner annular expansion member bearing radially outwardly against said annular outer member.

4. A piston assembly according to claim 2 wherein said seal means comprises an annular outer member of relatively non-deformable material and an inner annular expansion member bearing radially outwardly against said annular outer member.

5. A piston assembly according to claim 1 wherein said overlay comprises nylon or synthetic material having substantially equivalent physical properties.

6. A piston assembly according to claim 2 wherein said overlay comprises nylon or synthetic material having substantially equivalent physical properties.

7. A piston assembly according to claim 1 wherein said flanges have openings in radial faces thereof with said synthetic resin material extending into said openings to lock said overlay to said metal core.

8. A piston assembly according to claim 2 wherein said flanges have openings in radial faces thereof with said synthetic resin material extending into said openings to lock said overlay to said metal core.

9. A piston assembly according to claim 1 wherein said seal means extends radially inwardly between said metal core flanges to be supported therebetween in an axial direction.

10. A piston assembly according to claim 2 wherein said seal means extends radially inwardly between said metal core flanges to be supported therebetween in an axial direction.

11. A piston assembly according to claim 1 including a piston rod extending axially through said annular metal core, said piston rod having a radial face bearing directly against one radial face of said metal core and a threaded end portion, and nut means engaging said threaded piston rod end portion and bearing directly against the other radial face of said metal core to provide an axially rigid piston and piston rod assembly.

12. A piston assembly according to claim 2 including a piston rod extending axially through said annular metal core, said piston rod having a radial face bearing directly against one radial face of said metal core and a threaded end portion, and nut means engaging said threaded piston rod end portion and bearing directly against the other radial face of said metal core to provide an axially rigid piston and piston rod assembly.

* * * * *